(No Model.)

J. D. SCHOFIELD.
SIGHT FEED FOR PLANTERS.

No. 552,552. Patented Jan. 7, 1896.

Attest.
Edw. D. Duvall Jr.
Milton O'Connell

Inventor.
James D. Schofield.
by W. T. Duvall, Atty.

UNITED STATES PATENT OFFICE.

JAMES DROMMOND SCHOFIELD, OF DALLAS, TEXAS.

SIGHT-FEED FOR PLANTERS.

SPECIFICATION forming part of Letters Patent No. 552,552, dated January 7, 1896.

Application filed July 25, 1895. Serial No. 557,114. (No model.)

*To all whom it may concern:*

Be it known that I, JAMES DROMMOND SCHOFIELD, a citizen of the United States, residing at Dallas, in the county of Dallas and State of Texas, have invented certain new and useful Improvements in Sight-Feeds for Planters; and I do hereby declare the following to be a full, clear, and exact description of the invention, such as will enable others skilled in the art to which it appertains to make and use the same.

My invention relates to improvements in planters, and more particularly to that class thereof wherein a rotatable feed-disk is employed for delivering the seed to the spout.

The objects of my invention are to provide means whereby the operator who is following the planter may be enabled to accurately observe the workings of the same and the delivery of the seed, and thus see at all times that a proper planting is taking place.

Other objects and advantages of the invention will hereinafter appear, and the novel features thereof will be more particularly pointed out in the claims.

Figure 1:
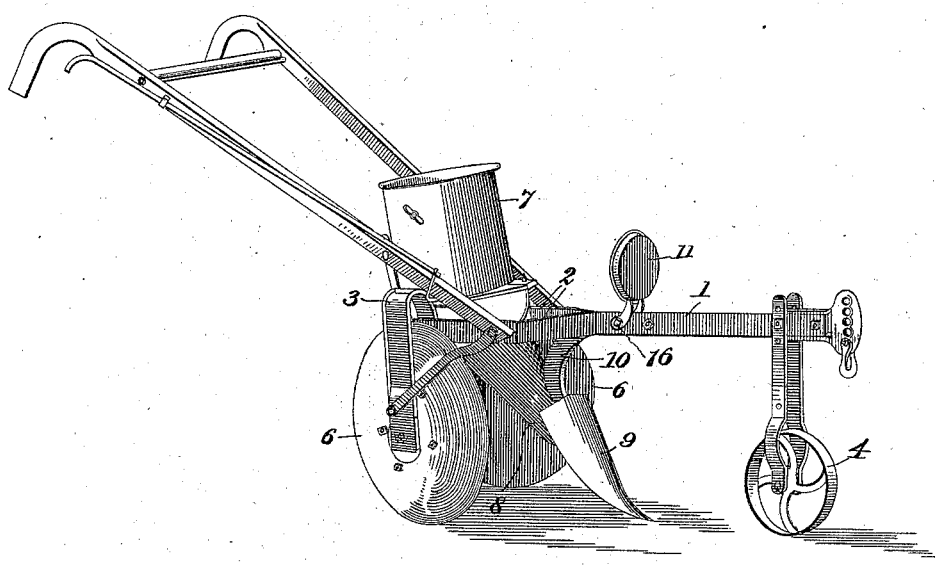
Figure 2:
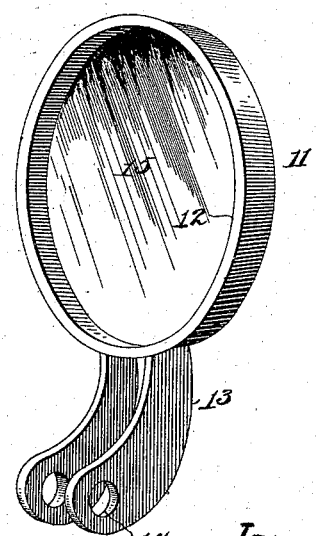

Referring to the drawings, Figure 1 is a perspective view of a planter, the same being provided with a sight attachment constructed in accordance with my invention. Fig. 2 is a detail in perspective of the attachment.

Like numerals of reference indicate like parts in both figures of the drawings.

The beam 1 of the planter is in the present instance made of steel, and diverges at its rear end to produce the open frame 2, whose terminals are secured to the yoke-shaped casting 3. The beam and yoke-shaped frame are supported at the front by means of the usual ground-wheel 4, journaled in the depending standard 5, made fast at its upper end to the beam 1 and at its rear by the combined supporting and covering disks 6, which also serve, through the medium of the axle and other intermediary connections, to operate the seed-disk. (Not shown.) Suitable handles are secured at their lower ends to and diverge rearwardly from the open frame 2, and between them and supported by the yoke-frame is the cylindrical hopper 7, from the bottom of which the seed is discharged by any of the well-known methods. Below the hopper is located the delivery-spout 8, which is located in rear of the furrow-opener or shovel 9, the same being supported by the standard 10.

I have thus far described the ordinary planter, and one to which my invention is applicable and highly desirable. I wish it understood, however, that my invention is not limited to use in this particular construction of planter, but to the contrary is intended to be applied to any planter wherein the operation of seed-delivery is not discernible from the position of the operator, and I would also have it understood that there may be changes made in the specific construction of sight-feed hereinafter described, so as to adapt it to different planters and the positions it may be necessary to locate the device thereon for the purpose of serving its useful function of placing in full view the delivery operation of the planter. With this understanding I will proceed to detail the description of my invention.

The attachment consists in the present instance in a circular holder 11, having a surrounding flange 12, from the under side of which there depends a pair of ears or lugs 13, the same being perforated in transverse alignment, as at 14, and spaced a suitable distance apart to enable the ears or lugs to embrace somewhat loosely the beam 1. Within the holder 11 and embraced by the flanges 12 is the mirror 15.

The device as thus constructed is located upon the upper side of the beam, the lugs or ears embracing the opposite sides of the latter, and the perforations 14 of the lugs or ears aligning with the perforations formed in the beam itself. Passed through the perforations 14 of the lugs or ears and the corresponding perforation formed in the beam is a transversely-disposed adjusting and clamping bolt 16. It will be observed that by means of the aforesaid bolt the device is pivoted to the beam, and consequently may be readily adjusted so as to reflect to the vision of the operator the workings of the seed mechanism. By first loosening the nut on the bolt and adjusting the device and subsequently tightening the nut, it will be obvious that the device will become secured at any point of its adjustment.

From the foregoing description, in connection with the accompanying drawings, it will be apparent that I have provided a simple attachment for that class of planters wherein ordinarily the operations of the seed mechanism is not visible to the operator, which attachment clearly and unmistakably reflects at all times the operation of the seed mechanism, so that in the event of any stopping or clogging of these parts the same will be immediately noticeable to the operator and can be corrected.

The device is preferably cast in a single piece for the sake of convenience and cheapness of manufacture, though it may be otherwise made, if preferred.

Having thus described my invention, what I claim is—

1. The combination with a planter, of a feed reflector pivotally supported thereon in front of the feed-mechanism for back and forth adjustment, and means for securing the reflector at any point of its pivotal adjustment, substantially as specified.

2. The herein described feed reflector for planters, consisting of the circular flanged holder 11, the depending perforated beam-embracing ears 13 cast in a single piece, the adjusting bolt 16, and the mirror 15, substantially as specified.

In testimony whereof I affix my signature in presence of two witnesses.

JAMES DROMMOND SCHOFIELD.

Witnesses:
GEORGE W. ROGERS,
A. H. ESTES.